United States Patent
Asahara et al.

(10) Patent No.: US 9,354,809 B2
(45) Date of Patent: May 31, 2016

(54) DISPLAY DEVICE, DISPLAY PROGRAM AND DISPLAY METHOD

(75) Inventors: Tatsuya Asahara, Nishinomiya (JP); Masashi Ohhora, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 0 days.

(21) Appl. No.: 14/349,302

(22) PCT Filed: Oct. 3, 2011

(86) PCT No.: PCT/JP2011/005577
§ 371 (c)(1),
(2), (4) Date: Apr. 2, 2014

(87) PCT Pub. No.: WO2013/051047
PCT Pub. Date: Apr. 11, 2013

(65) Prior Publication Data
US 2015/0035772 A1    Feb. 5, 2015

(51) Int. Cl.
*G06F 3/0488* (2013.01)
*B63B 49/00* (2006.01)
*G01S 19/35* (2010.01)
(Continued)

(52) U.S. Cl.
CPC ............ *G06F 3/04883* (2013.01); *B63B 49/00* (2013.01); *G01C 21/203* (2013.01); *G01S 7/12* (2013.01); *G01S 7/22* (2013.01); *G01S 7/6218* (2013.01); *G01S 7/6272* (2013.01); *G01S 7/6281* (2013.01); *G01S 13/862* (2013.01); *G01S 19/35* (2013.01); *G06F 3/041* (2013.01); *G06F 3/0485* (2013.01); *G06F 3/04845* (2013.01); *G09B 29/106* (2013.01); *G01S 13/9307* (2013.01); *G06F 2203/04803* (2013.01); *G06F 2203/04806* (2013.01); *G06F 2203/04808* (2013.01); *G08G 3/02* (2013.01)

(58) Field of Classification Search
None
See application file for complete search history.

(56) References Cited

U.S. PATENT DOCUMENTS 5,327,398 A * 7/1994 Wansley et al. ............... 367/108
5,414,809 A * 5/1995 Hogan .................. G06F 3/0481
345/440

(Continued)

FOREIGN PATENT DOCUMENTS

CN        101285880 A    10/2008
JP          1185398 A     3/1999

(Continued)

OTHER PUBLICATIONS

ISA Japanese Patent Office, International Search Report of PCT/JP2011/005577, Mar. 19, 2012, WIPO, 1 page.

(Continued)

*Primary Examiner* — Antonio Xavier
(74) *Attorney, Agent, or Firm* — Alleman Hall McCoy Russell & Tuttle LLP (57) ABSTRACT

A touch panel device (display device) acquires a first sensor image, a second sensor image, and a third sensor image. The touch panel device displays acquired images in respective divided areas of a display screen. The touch panel device detects a predetermined touch gesture and detects an operated location of the touch gesture. The touch panel device identifies which image the operated location indicates. The touch panel device performing processing corresponding to the identified touch gesture (scrolling or zooming of a display image), and changes a direction or a motion range of the processing according to the identified sensor image.

5 Claims, 8 Drawing Sheets

(51) Int. Cl.

| | |
|---|---|
| *G01S 7/12* | (2006.01) |
| *G01S 7/22* | (2006.01) |
| *G01S 7/62* | (2006.01) |
| *G01S 13/86* | (2006.01) |
| *G06F 3/0485* | (2013.01) |
| *G09B 29/10* | (2006.01) |
| *G01C 21/20* | (2006.01) |
| *G06F 3/041* | (2006.01) |
| *G06F 3/0484* | (2013.01) |
| *G08G 3/02* | (2006.01) |
| *G01S 13/93* | (2006.01) |

(56) References Cited

U.S. PATENT DOCUMENTS

| | | | | |
|---|---|---|---|---|
| 5,465,622 | A * | 11/1995 | Freking | 73/597 |
| 5,867,150 | A * | 2/1999 | Bricklin et al. | 345/173 |
| 6,009,373 | A * | 12/1999 | Shimojima et al. | 701/519 |
| 6,195,609 | B1 * | 2/2001 | Pilley | G01C 23/00 342/36 |
| 6,360,168 | B1 * | 3/2002 | Shimabara | G01C 21/3638 340/990 |
| 6,628,299 | B2 * | 9/2003 | Kitayama | 345/635 |
| 6,642,936 | B1 * | 11/2003 | Engholm et al. | 345/661 |
| 6,697,015 | B2 * | 2/2004 | Kiya | 342/176 |
| 6,833,851 | B1 | 12/2004 | Brunk | |
| 7,543,241 | B1 | 6/2009 | Brunk | |
| 8,296,001 | B1 * | 10/2012 | Kabel et al. | 701/21 |
| 8,712,605 | B1 * | 4/2014 | Schulte et al. | 701/3 |
| 2002/0145556 | A1 * | 10/2002 | Kiya | G01S 7/046 342/176 |
| 2002/0152266 | A1 * | 10/2002 | Burfeind et al. | 709/203 |
| 2004/0003958 | A1 * | 1/2004 | Fujimoto et al. | 181/124 |
| 2004/0064250 | A1 * | 4/2004 | Hirano | G01C 21/3614 701/410 |
| 2006/0038796 | A1 * | 2/2006 | Hinckley et al. | 345/173 |
| 2006/0089794 | A1 | 4/2006 | DePasqua | |
| 2009/0093275 | A1 * | 4/2009 | Oh et al. | 455/566 |
| 2009/0271054 | A1 | 10/2009 | Dokken | |
| 2010/0005419 | A1 * | 1/2010 | Miichi et al. | 715/828 |
| 2010/0211920 | A1 * | 8/2010 | Westerman et al. | 715/863 |
| 2010/0235794 | A1 * | 9/2010 | Ording | 715/863 |
| 2010/0309753 | A1 * | 12/2010 | Misonoo et al. | 367/107 |
| 2011/0004822 | A1 * | 1/2011 | Nezu et al. | 715/702 |
| 2011/0013484 | A1 * | 1/2011 | Coleman et al. | 367/88 |
| 2011/0022238 | A1 * | 1/2011 | Pollock et al. | 700/284 |
| 2011/0074716 | A1 * | 3/2011 | Ono | G06F 1/1626 345/173 |
| 2011/0275317 | A1 * | 11/2011 | Ryu | 455/41.1 |
| 2012/0078684 | A1 * | 3/2012 | Maciocci | G06Q 30/0201 705/7.29 |
| 2013/0018254 | A1 * | 1/2013 | Drucker | A61B 5/489 600/424 |
| 2013/0191066 | A1 * | 7/2013 | Spillane et al. | 702/135 |

FOREIGN PATENT DOCUMENTS

| | | |
|---|---|---|
| JP | 2008282390 A | 11/2008 |
| WO | 2006017511 A2 | 2/2006 |
| WO | 2008031880 A2 | 3/2008 |

OTHER PUBLICATIONS

European Patent Office, Extended European Search Report Issued in Application No. 11869512.1, Aug. 17, 2015, Germany, 9 pages.

* cited by examiner

DISPLAY DEVICE, DISPLAY PROGRAM AND DISPLAY METHOD

TECHNICAL FIELD

The present invention mainly relates to a display device that displays information obtained from sensors.

BACKGROUND ART

Conventionally, display devices which are connected with two or more kinds of sensors and displays information obtained from these sensors as a sensor image have been known. This kind of display device may adopt a configuration in which a display screen is divided so as to simultaneously display a plurality of sensor images. Patent Documents 1 and 2 disclose this kind of display device.

The display devices of Patent Documents 1 and 2 are carried in a ship, acquires positional information from a GPS antenna and creates an image showing, for example, a nautical chart around the ship, while they acquires a measurement result from a depth sounder and creates an image showing an underwater state. The display devices can simultaneously display the created two images so that the display screen is divided.

REFERENCE DOCUMENTS OF CONVENTIONAL ART

Patent Document 1: U.S. Pat. No. 6,833,851
Patent Document 2: U.S. Pat. No. 7,543,241

DISCLOSURE OF THE INVENTION

Problems to be Solved by of the Invention

In the meantime, when dividing the display screen to display the image as described above, the feeling of operation on the image may not be unified between the images displayed. In this case, a user needs to study operation methods for every image, and will get confused.

Especially, in the display device which adopts a touch panel, instinctive operations are often required, and if the feeling of operation is not unified between the images, much more confusion will be caused.

SUMMARY AND EFFECTS OF THE INVENTION

The present invention is made in view of the above situation, and one object of the invention is to provide, in a display device that can divide a display screen so as to display information obtained from two or more kinds of sensors, and can detect a touch operation, a configuration for performing processing, such as scrolling, taking characteristics of each image into consideration.

Problems to be solved by the invention is described above, and means for solving the problems and effects thereof will be described below.

According to a first aspect of the invention, a display device having the following configuration is provided. Thus, the display device includes a detector, an image acquirer, a display unit, a gesture detector, an operated location detector, a divided area identifier, and an image processor. The detector detects a touch operation. The image acquirer acquires at least two of a navigation image containing map or nautical chart information created based on information obtained from a GNSS sensor for detecting a location of the display device, an underwater detection image created based on information obtained from an ultrasonic transducer for detecting underwater directly under the display device, and a radar image obtained from a radar antenna for detecting a location of an object around the display device. The display unit displays acquired images in respective divided areas of a display screen. The gesture detector detects a predetermined touch gesture based on the touch operation detected by the detector. The operated location detector detects an operated location of the touch gesture. The divided area identifier identifies which image among the images is displayed in the divided area corresponding to the operated location detected by the operated location detector. The image processor is provided with a function to perform scrolling or zooming of the display screen corresponding to the touch gesture, and changes a direction or a motion range according to the image being displayed in the identified divided area, upon performing the scrolling or zooming.

Thus, it can apply a certain limitation to one of the plurality of images (inhibiting the scrolling in a predetermined direction, limiting the motion range, etc.) against the scrolling or zooming processing, while preventing similar limitations from being applied to other images. Therefore, the scrolling or zooming processing can be performed in a mode according to characteristics of the image.

In the above display device, it is preferred to have the following configurations. Thus, the image processor does not fix the direction of scrolling or zooming when the image in the identified divided area is the navigation image. When the image in the identified divided area is the underwater detection image, the direction of scrolling or zooming is fixed.

Thus, it can apply a certain limitation (for example, inhibiting the scrolling in a depth direction) to the underwater detection image, while preventing similar limitations from being applied to the navigation image.

In the above display device, it is preferred to have the following configurations. Thus, the image processor does not limit the motion range of scrolling or zooming when the image in the identified divided area is the navigation image. When the image in the identified divided area is the radar image, the motion range of scrolling or zooming is limited.

Thus, it can apply a certain limitation (for example, limiting the motion range to a predetermined distance from a ship concerned) to the radar image, while preventing similar limitations from being applied to the navigation image.

In the above display device, it is preferred to have the following configurations. Thus, the image processor fixes the direction of scrolling or zooming when the image in the identified divided area is the underwater detection image. When the image in the identified divided area is the radar image, the direction of scrolling or zooming is not fixed.

Thus, it can apply a certain limitation (for example, inhibiting the scrolling in a depth direction) to the underwater detection image, while preventing similar limitations from being applied to the radar image.

In the above display device, it is preferred that the image processor limits the motion range of scrolling or zooming centering on the location of the display device when the image in the identified divided area is the radar image.

Thus, in a radar image, it can prevent that the location of the display device deviates from the radar image.

In the above display device, it is preferred to have the following configurations. Thus, the underwater detection image is an image where an underwater state directly under the display device is associated with time. The image processor fixes the direction of scrolling in a time-axis direction and fixes the direction of zooming in a direction perpendicular to the time-axis, when the image in the identified divided area is the underwater detection image.

Thus, the scrolling and zooming can be performed only in the desirable direction when verifying the underwater detection image.

In the above display device, it is preferred to be carried in a ship.

Thus, the effects of the present invention can be demonstrated in the sensor images obtained from sensors as ship instrument.

According to a second aspect of the invention, a display device of the following configurations is provided. Thus, the display device includes a detector, an image acquirer, a display unit, a gesture detector, an operated location detector, a divided area identifier, and an image processor. The detector detects a touch operation. The image acquirer acquires at least two or more images generated based on signals acquired by different sensors. The display unit displays acquired images in respective divided areas of a display screen. The gesture detector detects a predetermined touch gesture based on the touch operation detected by the detector. The operated location detector detects an operated location of the touch gesture. The divided area identifier identifies which image among the images is displayed in the divided area corresponding to the operated location detected by the operated location detector. The image processor is provided with a function to perform scrolling or zooming of the display screen corresponding to the touch gesture, and changes a direction or a motion range according to the image being displayed in the identified divided area, upon performing the scrolling or zooming. Thus, it can apply a certain limitation (inhibiting the scrolling in a predetermined direction, limiting the motion range, etc.) to one of the plurality of images (not limited to, for example, the above navigation image), while preventing similar limitations from being applied to other images.

According to a third aspect of the invention, the following display method is provided. Thus, this display method includes a detection step, an image acquisition step, a display step, a gesture detection step, an operated location detection step, a divided area identification step, and an image processing step. A touch operation is detected at the detection step. At the image acquisition step, at least two of a navigation image containing map or nautical chart information created based on information obtained from a GNSS sensor for detecting a location of the display device, an underwater detection image created based on information obtained from an ultrasonic transducer for detecting underwater directly under the display device, and a radar image obtained from a radar antenna for detecting a location of an object around the display device are acquired. Acquired images are displayed in respective divided areas of a display screen at the display step. At the gesture detection step, a predetermined touch gesture is detected based on the touch operation detected at the detection step. An operated location of the touch gesture is detected at the operated location detection step. At the divided area identification step, which image among the images is displayed in the divided area corresponding to the operated location detected at the operated location detection step is identified. At the image processing step, it has a function to perform scrolling or zooming of the display screen corresponding to the touch gesture, and changes a direction or a motion range according to the image being displayed in the identified divided area, upon performing the scrolling or zooming.

Thus, it can apply a certain limitation (inhibiting the scrolling in a predetermined direction, limiting the motion range, etc.) to one of the plurality of images, while preventing similar limitations from being applied to other images.

According to a fourth aspect of the invention, a display program of the following configurations is provided. Thus, this display program causes a computer to execute a detection procedure, an image acquisition procedure, a display procedure, a gesture detection procedure, an operated location detection procedure, a divided area indentifying procedure, and an image processing procedure. A touch operation is detected in the detection procedure. In the image acquisition procedure, at least two of a navigation image containing map or nautical chart information created based on information obtained from a GNSS sensor for detecting a location of the display device, an underwater detection image created based on information obtained from an ultrasonic transducer for detecting underwater directly under the display device, and a radar image obtained from a radar antenna for detecting a location of an object around the display device are acquired. In the display procedure, acquired images are displayed in respective divided areas of a display screen. In the gesture detection procedure, a predetermined touch gesture is detected based on the touch operation detected in the detection procedure. An operated location of the touch gesture is detected in the operated location detection procedure. In the divided area indentifying procedure, which image among the images is displayed in the divided area corresponding to the operated location detected in the operated location detection procedure is identified. In the image processing procedure, it has a function to perform scrolling or zooming of the display screen corresponding to the touch gesture, and changes a direction or a motion range according to the image being displayed in the identified divided area, upon performing the scrolling or zooming.

Thus, it can apply a certain limitation (inhibiting the scrolling in a predetermined direction, limiting the motion range, etc.) to one of the plurality of images, while preventing similar limitations from being applied to other images.

MODE OF CARRYING OUT THE INVENTION

Figure 1:
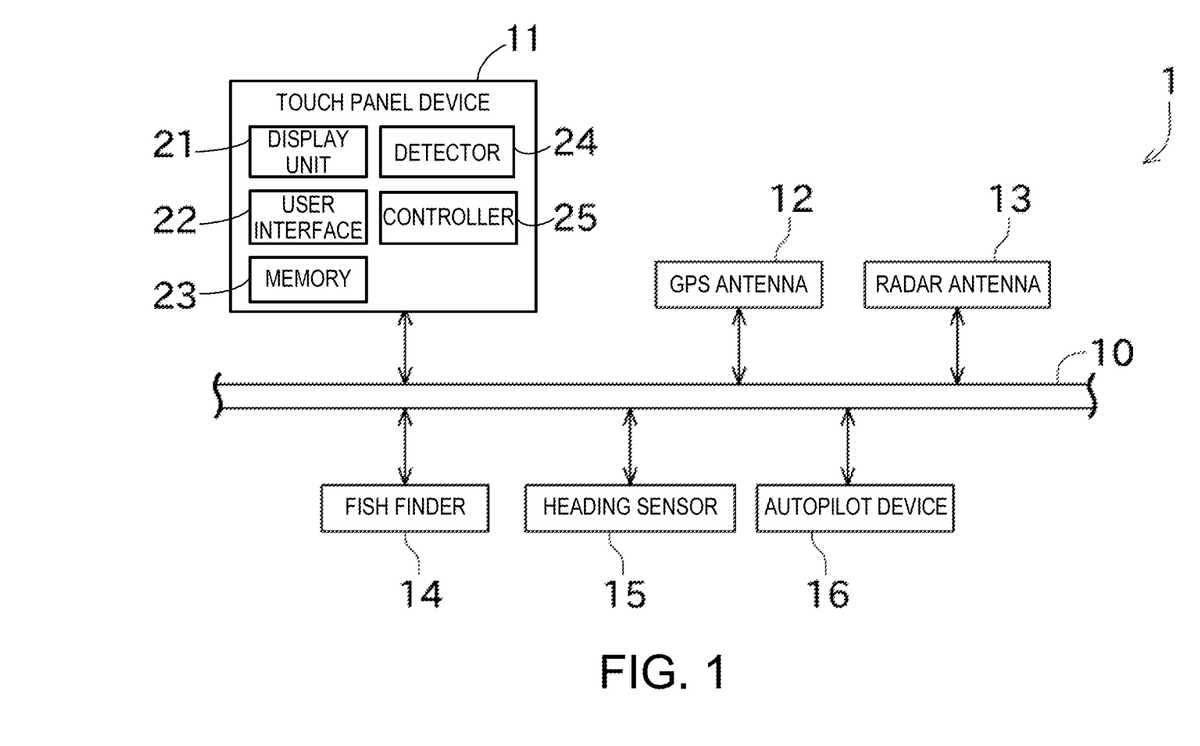
FIG. 1 is a block diagram showing an entire configuration of a ship instrument network system.
Figure 2:
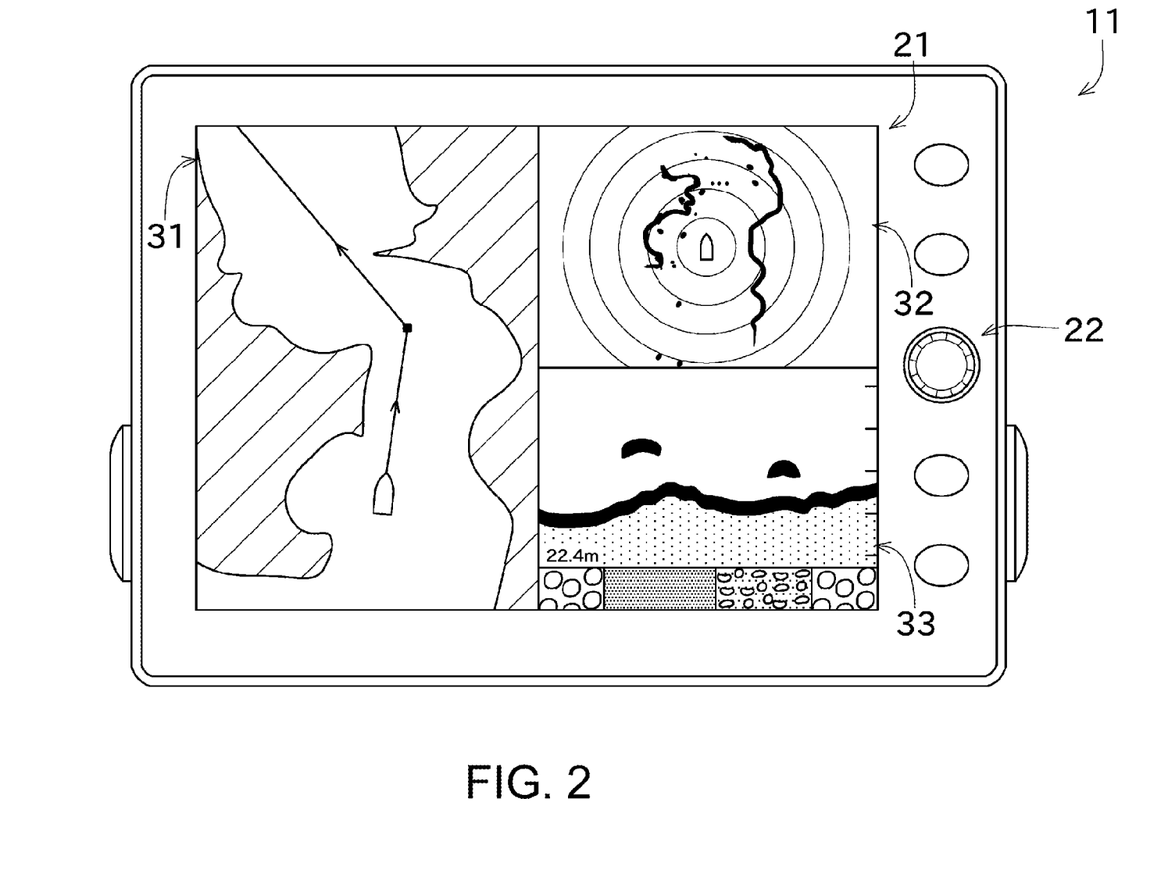
FIG. 2 is an elevational view of a touch panel device.

Next, one embodiment of the invention is described with reference to the drawings. FIG. 1 is a block diagram showing an entire configuration of a ship instrument network system 1. FIG. 2 is an elevational view of a touch panel device 11.

The ship instrument network system 1 of this embodiment includes a plurality of ship instrument connected to a ship network 10. Ship instrument can exchange detected information via the ship network 10. As a standard of the ship network 10, LAN (Local Area Network) or CAN (Controller Area Network) can be employed, for example.

As shown in FIG. 1, the ship instrument network system 1 of this embodiment includes a device 11 having a touch panel (hereinafter, simply referred to as "the touch panel device"), a GPS antenna 12 (GNSS sensor), a radar antenna 13, a fish finder 14 (acoustic sensor), a heading sensor 15, and an autopilot device 16.

The touch panel device 11 has a configuration to create and display an image (sensor image) based on information detected by other ship instrument (sensors), detect a touch operation to a display screen, and perform processing according to a detection result. Specifically, the touch panel device 11 includes a display unit 21, a user interface 22, a memory 23, a detector 24, and a controller 25.

The display unit 21 is comprised of, for example, a liquid crystal display, and can display, for example, a sensor image, and various setting screens on the display screen as described above.

The user interface 22 is comprised of hardware keys, such as a rotary key to which a clockwise or counterclockwise rotational operation is possible, and a menu key to call a menu screen. Note that, since the touch panel device 11 can be inputted and instructed by a touch operation on the display screen, it can reduce the number of keys in the user interface 22.

The memory 23 stores contents of program(s) to be executed by the controller 25, nautical chart information, traveling route(s) set by the user, etc.

The detector 24 detects the touch operation on the screen by a user. In this embodiment, a projected capacitance system is used as a system for detecting the touch operation. This system has a configuration in which a plurality of high transparency electrodes are arranged on a display panel and a touched location is detected based on a change in electric capacity of each electrode which occurs when a fingertip approaches the panel. With this configuration, not only the touched location but a finger motion in a touching state can be detected. Moreover, the detector 24 can also detect touched locations and changes of each touched location when two or more locations are touched simultaneously. The touched location and the change in the touched location detected by the detector 24 are outputted to the controller 25. Note that the system for detecting the touch operation is not limited to the projected capacitance system, but any other suitable system may be employed. Moreover, other than the touch operation with a finger, a configuration in which a touch operation using a tapered stick member may also be detected, for example.

The controller 25 creates the sensor images (such as a radar image and a nautical chart around the ship) based on the stored content of the memory 23 and information received from other ship instrument, and displays them on the display unit 21. The controller 25 receives information from a plurality of ship instrument, and creates a plurality of sensor images. The controller 25 can switch between a mode in which only one of the plurality of sensor images is displayed on the display screen (full screen mode) and a mode in which the display screen is divided and, the plurality of sensor images are displayed (split screen mode: see FIG. 2).

Moreover, the controller 25 identifies which touch gesture is performed by the user by executing a matching of the content of the touch operation set in advance (touch gesture) and a change of the touched location detected by the detector 24. Then, the controller 25 performs processing corresponding to the touch gesture identified.

An example of the touch gesture includes a "drag operation." The drag operation is a touch gesture in which a touching finger (usually one finger) is moved in a predetermined direction without separating from the display screen. Scrolling of the image is usually associated with the drag operation. Note that the drag operation includes an operation in which a finger is quickly moved while the finger touches the display screen (flick operation). Moreover, another example of the touch gesture includes a "pinch operation." The pinch operation is an operation in which, without separating two touching fingers from the display screen, the fingers bringing close to each other (pinch in) or separating from each other (pinch out). Processing for changing a scale of the image (processing for performing a zooming) is usually associated with the pinch operation. Note that the controller 25 can also identify various touch gestures other than the example illustrated above.

The GPS antenna 12 receives positioning signals from GPS Satellites (GNSS satellites), and outputs them to the touch panel device 11 and the like via the ship network 10. The controller 25 of the touch panel device 11 obtains a location of the ship based on the positioning signals (in detail, a location of a GPS antenna or an absolute location in a terrestrial reference frame). Note that a configuration in which a calculation for finding a location based on the positioning signals is performed on the GPS antenna 12 side, and the location of the ship is outputted to the touch panel device 11 may also be possible.

The touch panel device 11 can exhibit a function as a navigation equipment based on the obtained location of the ship and the nautical chart information stored in the memory 23. Specifically, the controller 25 can superimpose the location of the ship on the nautical chart based on the acquired location of the ship and the nautical chart information stored in the memory 23, and display it on the display unit 21. Moreover, the controller 25 can find a ground speed of the ship using the location of the ship which changes with time and find a trace of the ship to display them on the display unit 21. Further, the controller 25 can create a traveling route and display it on the display unit 21 by a user selecting a destination and a waypoint (a stopover) with a touch operation (see a first sensor image 31 shown in FIG. 2).

The radar antenna 13 transmits a microwave and receives a reflection wave from an object. This reflection wave is outputted to the touch panel device 11 after suitable signal processing is performed. The touch panel device 11 creates a radar image based on the reflection wave. Specifically, the controller 25 of the touch panel device 11 finds a distance of the object based on a time length after transmitting the microwave until it receives the reflection wave. The controller 25 finds a direction in which the object exists based on a transmitted direction of the microwave. Thus, the controller 25 creates the radar image and displays it on the display unit 21 (see a second sensor image 32 shown in FIG. 2).

The fish finder 14 is comprised of a transducer and an analyzer. The transducer is installed on, for example, the bottom of the ship, and it discharges an ultrasonic wave directly below into the sea and receives the reflection wave from a seabed or a school of fish. The analyzer creates fish finding data (data acquired by the fish finder or data of the school of fish or the seabed) based on the reflection wave. Moreover, the fish finder 14 of this embodiment has a function to determine an underwater state (a bottom sediment type) based on the acquired fish finding data. Specifically, the analyzer can determine whether the seabed falls under any of rocks, gravel (stones), sand, and mud with high possibility, by analyzing the reflection wave received. The fish finding data and the determined bottom sediment type are outputted to the touch panel device 11. Then, the controller 25 of the touch panel device 11 creates a third sensor image 33 (see FIG. 2) based on the received data, and displays it on the display unit 21. In the third sensor image 33, a vertical axis indicates fish finding data and a horizontal axis indicates a time point when the fish finding data is acquired (it gets older as it goes toward the left end of the display screen).

The heading sensor 15 is configured to detect a heading of the ship (a direction of a bow of the ship) by an absolute azimuth in the terrestrial reference frame. Generally, a ship travels forward, toward the bow direction. Therefore, it can also be said that the heading sensor 15 detects an azimuth of the forward direction of a hull of the ship. A magnetic azimuth sensor, a GPS compass or the like may also be used for the heading sensor 15, for example.

The autopilot device 16 is a device for automatically operating a rudder so that the ship travels along the set traveling route. Specifically, the autopilot device 16 finds how much the bow of the ship is to be changed based on the heading acquired from the heading sensor 15 and the traveling route acquired from the touch panel device 11. Then, the autopilot device 16 coincides the course of the ship with the traveling route by changing an angle of the rudder according to the calculated value.

The ship instrument network system 1 of this embodiment is configured as described above. Note that the ship instrument which constitutes the ship instrument network system 1 may be arbitrary configured, and the system may have a configuration in which ship instrument other than illustrated above may also be connected, or may have a configuration in which two or more ship instrument of similar type may also be connected. Moreover, the processing of the data acquired by the ship instrument may be configured to be performed by the ship instrument concerned, or may be configured to be performed in the controller 25 of the touch panel device 11.

Next, processing performed by the controller 25 in the divided display mode when the touch operation is performed on the image respectively displayed on the divided screens will be described. Below, an image based on the information obtained from the sensor(s) is referred to as a "sensor image." More specifically, an image containing the map or the nautical chart created based on the information obtained from the GPS antenna 12 is referred to as a "first sensor image 31" (navigation image). An image obtained from the radar antenna 13 is referred to as a "second sensor image 32" (radar image), and an image created based on the information obtained from the above transducer is referred to as a "third sensor image 33" (underwater detection image).

Further, in this embodiment, it is considered that in each sensor image, a drag operation is associated with scrolling of the display image, and a pinch-out operation is associated with zooming processing. Thus, the touch panel device 11 has a common correspondence relation of the sensor image between the touch gesture and processing performed by the controller 25 when it detects the touch gesture. However, the controller 25 is configured such that the touch panel device 11 changes a direction or a motion range of the scrolling or the zooming according to the sensor image on which the touch gesture is performed.

Figure 3:
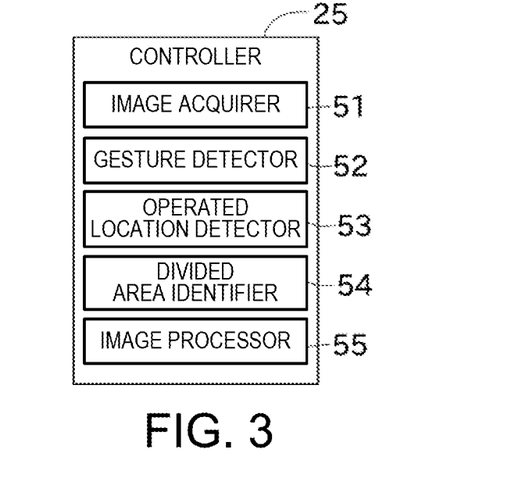
FIG. 3 is a block diagram showing a configuration of a controller.

First, a detailed configuration of the controller 25 will be described with reference to FIG. 3. FIG. 3 is a block diagram showing a configuration of the controller 25. As shown in FIG. 3, the controller 25 includes an image acquirer 51, a gesture detector 52, an operated location detector 53, a divided area identifier 54, and an image processor 55.

The image acquirer 51 acquires the first sensor image 31, the second sensor image 32, and the third sensor image 33. Note that, in this embodiment, the sensor image is configured to be created by an image creator (not illustrated) of the touch panel device 11, and the image acquirer 51 acquires the sensor image from the image creator. Note that, alternatively to this configuration, it may be a configuration in which instrument external to the touch panel device 11 (such as the fish finder 14) creates the sensor image. In this case, the image acquirer 51 acquires the sensor image from the instrument external to the touch panel device 11.

The gesture detector 52 detects a predetermined touch gesture (such as the drag operation or the pinch operation) based on the touch operation detected by the detector 24, as described above.

The operated location detector 53 detects an operated location of the touch gesture. As the operated location, a first touched location where the touch gesture is performed may be used, or a central location of the touch gesture may be used, for example. The central location of the touch gesture refers, for example, if a drag operation is performed, to a location corresponding to a central part of a line segment indicating a locus of the drag. The central location if the pinch operation is performed is a location corresponding to a central part of a line segment drawn by connecting two touched locations.

The divided area identifier 54 identifies which image is displayed in a divided area corresponding to the operated location detected by the operated location detector 53. Thus, when the operated location is on the first sensor image 31, the divided area identifier 54 identifies that the touch gesture is performed on the first sensor image 31.

The image processor 55 has a function to perform scrolling or zooming processing of the display screen corresponding to the touch gesture, and changes the direction or the motion range according to the image being displayed in the identified divided area, upon performing the scrolling or zooming.

Figure 4:
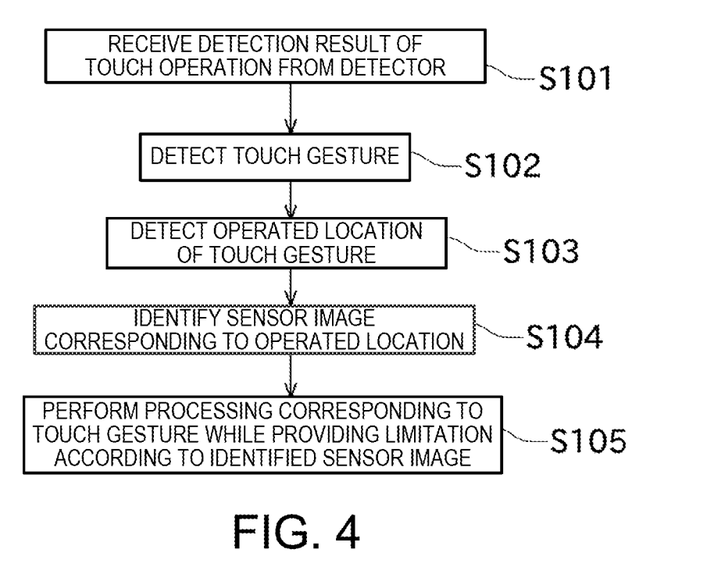
FIG. 4 is a flowchart showing processing executed by the controller when a touch operation performed.

Next, processing performed by the controller 25 against the detection result of the detector 24 will be described with reference to FIG. 4. FIG. 4 is a flowchart showing processing performed by the controller 25 when the touch operation is performed. The controller 25 receives a detection result of the touch operation from the detector 24 (S101). The controller 25 (gesture detector 52) detects the touch gesture performed by the user by performing matching of the change in the touched location received from the detector 24 with the touch gesture set in advance (S102). Moreover, the controller 25 (operated location detector 53) identifies the operated location of the touch gesture based on the touched location detected by the detector 24 (S103). Next, the controller 25 (divided area identifier 54) identifies which image is displayed in the divided area corresponding to the operated location (S104). Then, the controller 25 (image processor 55) changes a part of settings according to the sensor image identified at S104, and performs processing corresponding to the touch gesture identified at S102 (S105).

Figure 5:
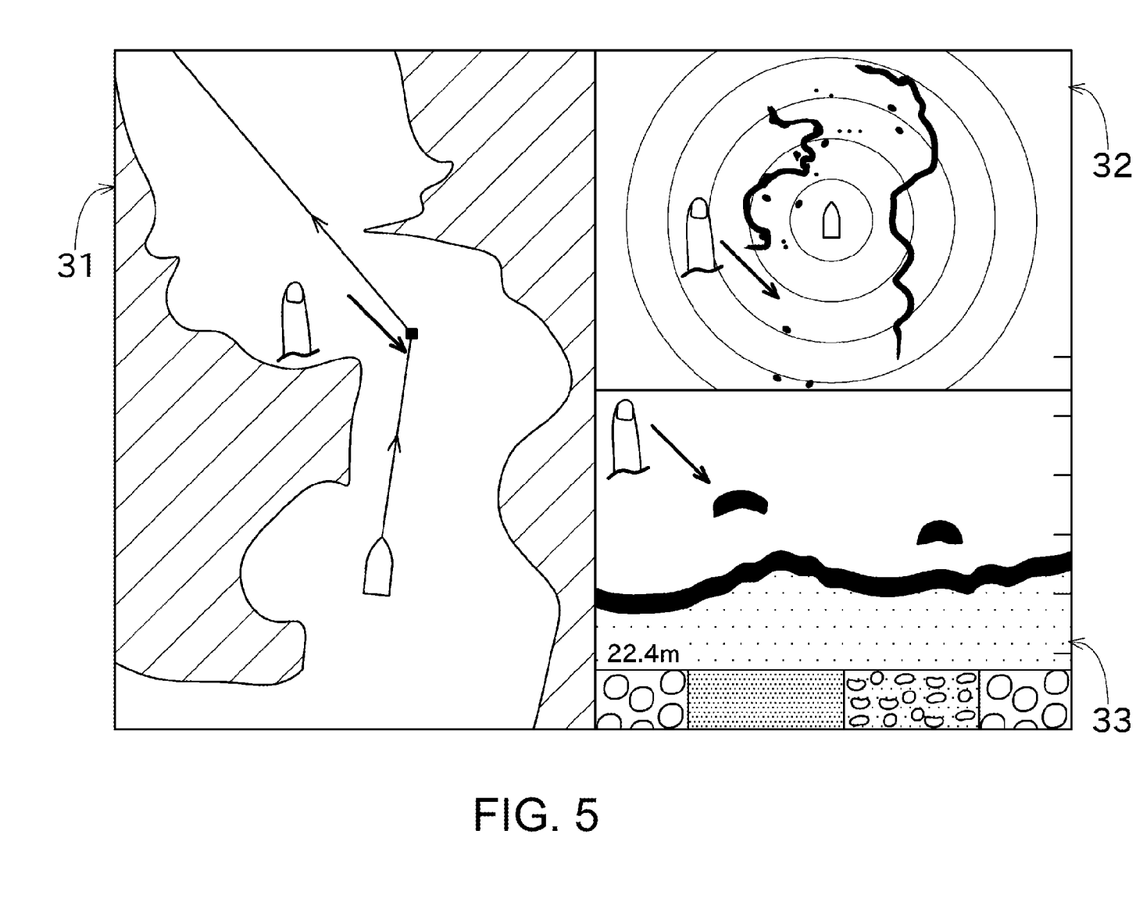
FIG. 5 is a view showing a display screen before a drag operation is performed.
Figure 6:
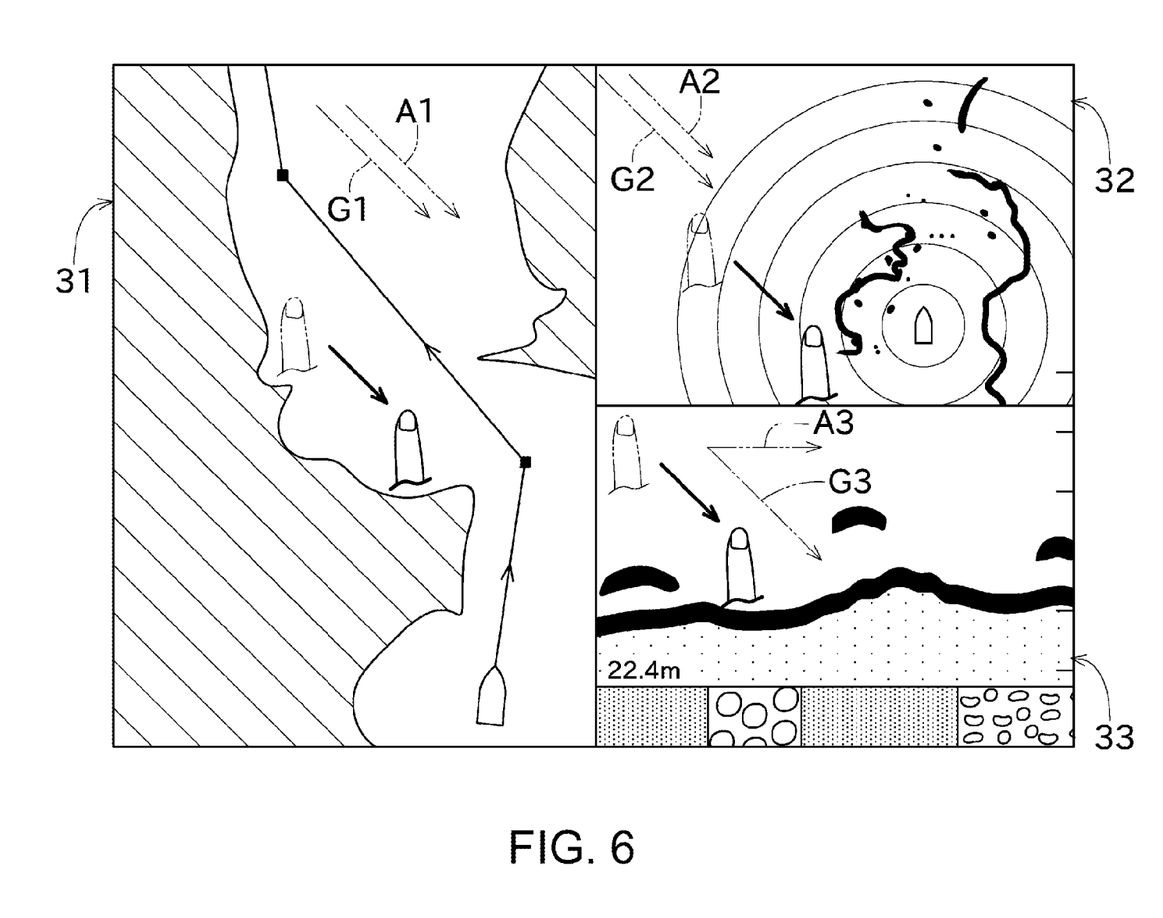
FIG. 6 is a view showing the display screen after a drag operation is performed.

Next, with reference to FIGS. 5 and 6, processing performed by the controller 25 when the drag operation is performed on each sensor image will be described. FIGS. 5 and 6 are views showing display screens of the display unit 21 before and after performing the drag operation on each sensor image.

Note that, the controller 25 can recognize that the drag operation is performed by the processing at S102 of FIG. 4, and can identify the sensor image on which the drag operation is performed by the processing at S104.

First, a case where the drag operation is performed on the first sensor image 31 will be described. Here, it is assumed that the user moved his/her finger from the location shown in the first sensor image 31 of FIG. 5 to the location shown in the first sensor image 31 of FIG. 6. At this time, the controller 25 scrolls the first sensor image 31 along with the movement of the finger (as it is dragged by the finger). Therefore, in the example of the drag operation shown in the portion of the first sensor image 31 of FIG. 6, a vector G1 indicating a direction and a quantity of the finger movement on the screen image is in agreement with a vector A1 indicating an actual scroll direction and quantity on the screen image.

Next, a case where the drag operation is performed on the second sensor image 32 will be described. Here, it is assumed that the user moved his/her finger from the location shown in the second sensor image 32 of FIG. 5 to the location shown in the second sensor image 32 of FIG. 6. At this time, the controller 25 scrolls the second sensor image 32 along with the movement of the finger (as it is dragged by the finger). Here, the second sensor image 32 is an image showing a relative location of an object with respect to the location of the ship. Therefore, it is preferred that the location of the ship is always displayed on the screen. Therefore, for the second sensor image 32, the controller 25 determines the motion range of scrolling centering on the location of the ship concerned so that a mark of the ship and its vicinity do not deviate from the display screen. Therefore, in the example of the drag operation shown in the portion of the second sensor image 32 of FIG. 6, the vector A2 indicating the actual scroll direction and quantity on the screen image is shorter than the vector G2 indicating the direction and quantity of the finger movement on the screen image (scrolling is smaller).

Next, a case where the drag operation is performed on the third sensor image 33 will be described. Here, it is assumed that the user moved his/her finger from the location shown in the third sensor image 33 of FIG. 5 to the location shown in the third sensor image 33 of FIG. 6. At this time, the controller 25 scrolls the third sensor image 33 along with the movement of the finger (as it is dragged by the finger). Here, since the third sensor image 33 is normally displayed so that the fish finding data from the seabed to the ship is contained therein in the vertical direction, it does not need to be scrolled in the vertical direction. Therefore, the controller 25 fixes the scroll direction of the third sensor image 33 to a horizontal direction (time-axis direction). Therefore, in the example of the drag operation shown in the portion of the third sensor image 33 of FIG. 6, the vector indicating a component in the horizontal direction of a vector G3 indicating the direction and quantity of the finger movement on the screen image is in agreement with a vector A3 indicating the actual scroll direction and quantity on the screen image.

Thus, each sensor image can be scrolled by performing the drag operation. Although there is no limitation for the scrolling of the first sensor image 31, limitations are provided for the scrolling of the second sensor image 32 and the third sensor image 33 according to characteristics of the sensor images. By providing the limitations in this way, for the second sensor image 32, since the ship mark will not disappear from the second sensor image 32 even if the user drags greatly, accuracy is not required for a drag amount (scroll amount) of the drag operation performed on the second sensor image 32. For the third sensor image 33, since the third sensor image 33 will be scrolled in the time-axis direction even if the user drags obliquely, accuracy is not required in the drag direction (scroll direction) of the drag operation performed on the third sensor image 33. Therefore, a user's operability can be improved.

Figure 7:
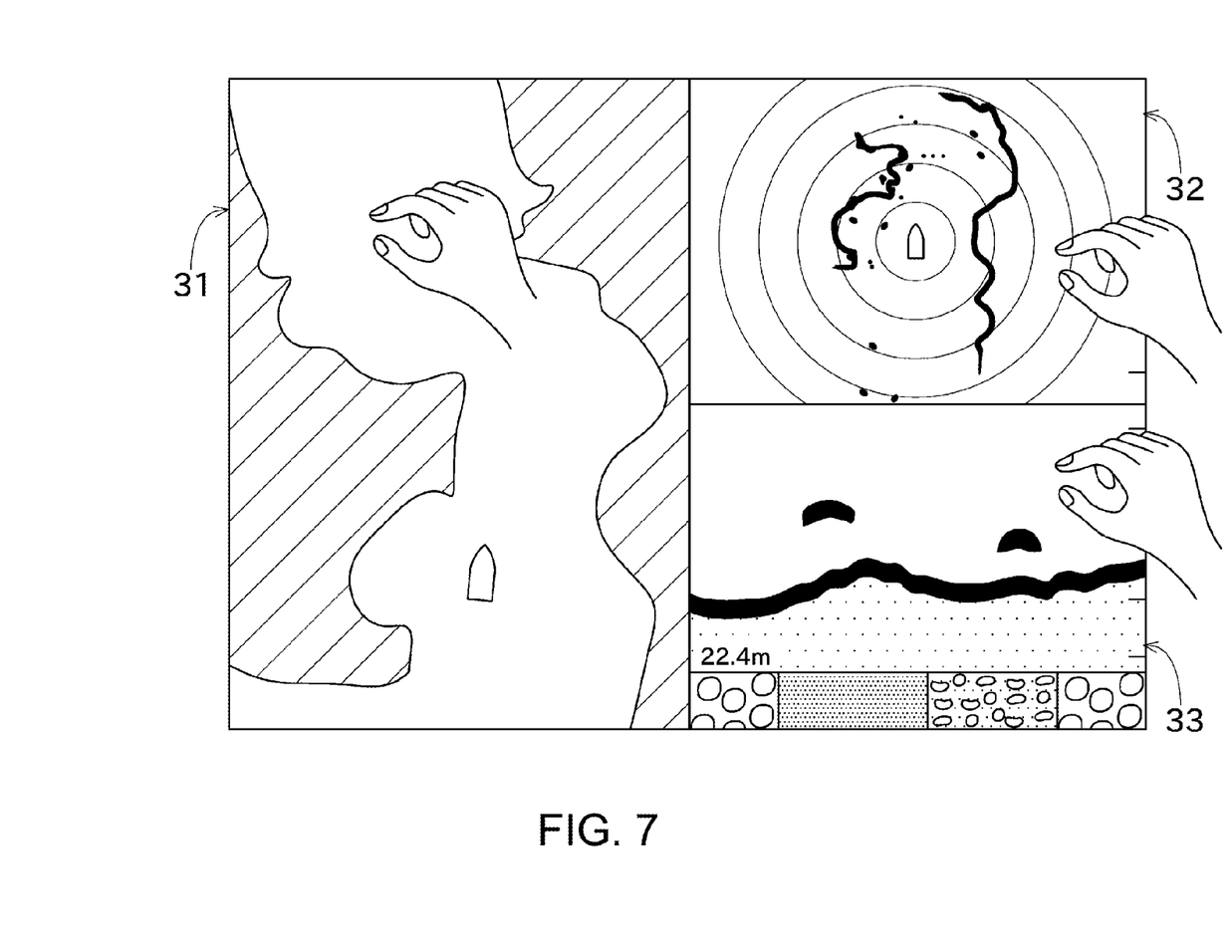
FIG. 7 is a view showing the display screen before a pinch-out operation is performed.
Figure 8:
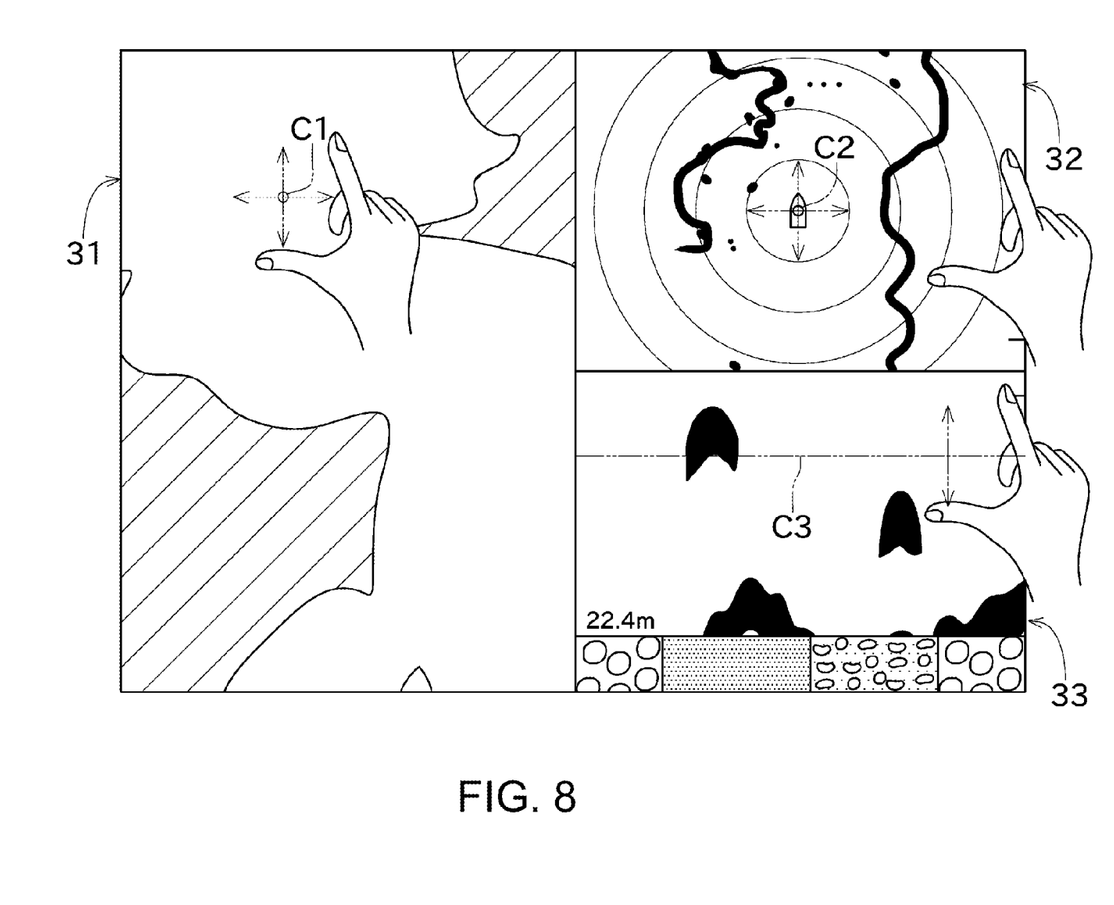
FIG. 8 is a view showing the display screen after a pinch-out operation is performed.

Next, with reference to FIGS. 7 and 8, processing performed by the controller 25 when the pinch-out operation is performed on each sensor image will be described. FIGS. 7 and 8 are views showing display screens of the display unit 21 before and after performing the pinch-out operation for each sensor image.

Note that, the controller 25 can recognize that the pinch-out operation is performed by the processing at S102 of FIG. 4, and can identify the sensor image on which the pinch-out operation is performed by the processing at S104.

First, a case where the pinch-out operation is performed on the first sensor image 31 will be described. Here, it is assumed that the user performs the pinch-out operation at a location shown in the first sensor image 31 of FIG. 7. At this time, the controller 25 performs zoom-in processing of the first sensor image 31 by using a central part of two touched locations as a reference location (reference point) C1. Note that the first sensor image 31 is zoomed in both in the vertical direction and the horizontal direction (two-dimensionally).

Next, a case where the pinch-out operation is performed on the second sensor image 32 will be described. Here, it is assumed that the user performed the pinch-out operation at a location shown in the second sensor image 32 of FIG. 7. At this time, the controller 25 performs zoom-in processing of the second sensor image 32 regardless of the touched location by using the location of the ship as a reference location (reference point) C2. Note that the second sensor image 32 is zoomed in both in the vertical direction and the horizontal direction (two-dimensionally). That is, a limitation is provided at the reference location of the zoom-in (the same can be said for zoom-out) in the second sensor image 32.

Next, a case where the pinch-out operation is performed on the third sensor image 33 will be described. Here, it is assumed that the user moved his/her finger from the location shown in the third sensor image 33 of FIG. 7 to the location shown in the third sensor image 33 of FIG. 8. Here, the third sensor image 33 is preferred to be normally kept the same in scale in the time-axis direction. Therefore, the controller 25 performs the zoom-in processing of the third sensor image 33 by using a line which passes through the central part of the two touched locations and is parallel to the time-axis, as a reference location (reference line) C3. Note that the zoom-in direction of the third sensor image 33 is fixed to the vertical direction (a direction perpendicular to the time-axis) (one-dimensional zoom-in processing is performed). That is, the direction of zoom-in (the same can be said of zoom-out) is fixed in the third sensor image 33.

Thus, each sensor image can be zoomed in by performing the pinch-out operation. Although there is no limitation for the zoom-in of the first sensor image 31, limitations are provided for scrolling of the second sensor image 32 and the third sensor image 33, according to characteristics of the sensor images. By providing limitation in this way, since the ship does not disappear from the second sensor image 32 even if the user performs the pinch-out operation to arbitrary locations for the second sensor image 32, accuracy is not required for the locations at which the pinch-out operation is performed. Moreover, for the third sensor image 33, since the third sensor image 33 is zoomed in in the vertical direction even if the user performs the pinch-out operation in arbitrary directions, accuracy is not required for the directions the pinch-out operation is performed. Therefore, the user's operability can be improved.

As illustrated above, the touch panel device 11 (display device) acquires the first sensor image 31 (navigation image), the second sensor image 32 (radar image), and the third sensor image 33 (underwater detection image). The touch panel device 11 displays the acquired images in the respective divided areas on the display screen. The touch panel device 11 detects the predetermined touch gesture, and detects the operated location of the touch gesture. The touch panel device 11 identifies which image is displayed corresponding to the operated location. The touch panel device 11 executes processing corresponding to the identified touch gesture (scrolling or zooming processing of the display image), and changes the direction or the motion range of the processing according to the identified sensor image.

Therefore, the processing performed according to the contents of the touch gestures are made common between the sensor images to unify a feeling of operation and, thus, the processing can be performed in a mode according to the characteristics of the sensor images.

Although a suitable embodiment of the present invention is illustrated above, the above configuration may be modified as follows, for example.

Figure 9:
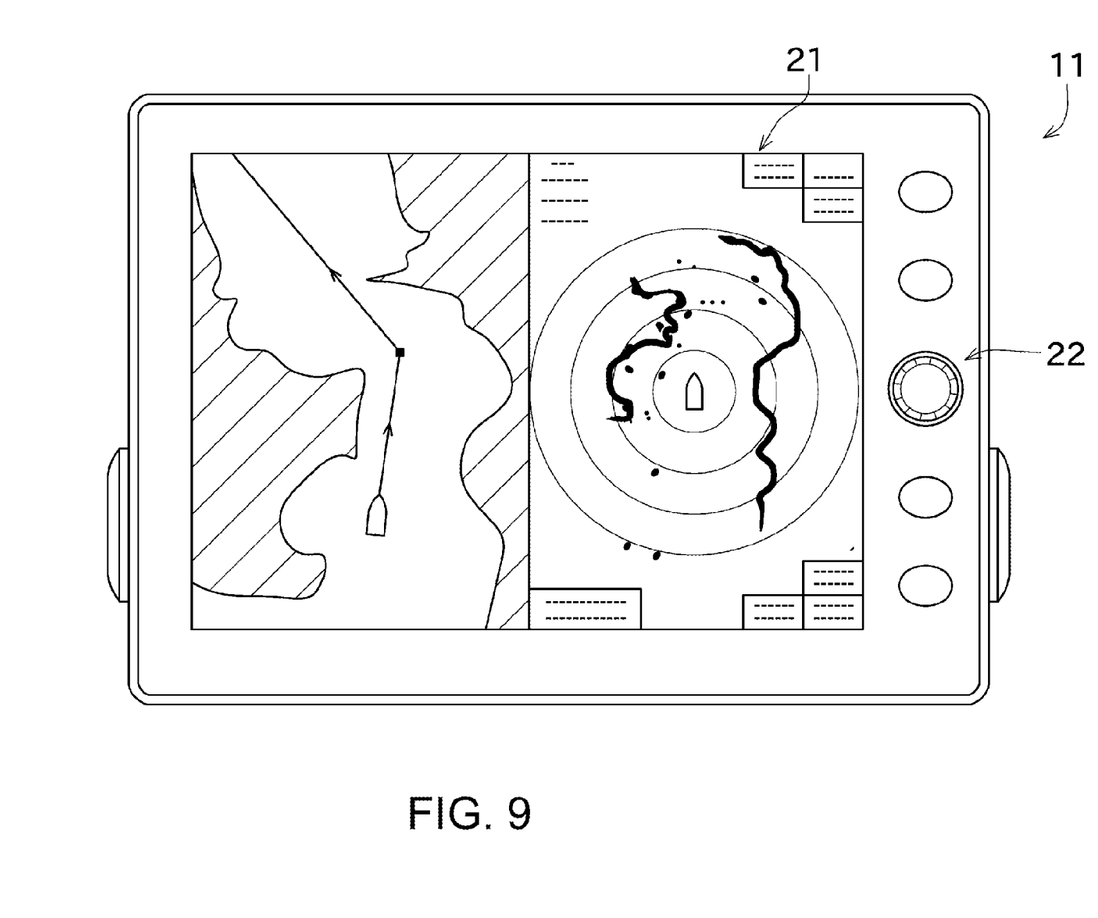
FIG. 9 is a view showing another example of the display screen.

Although the above embodiment illustrates the configuration in which the display screen is divided into three, it may be divided into two (the first sensor image and the second sensor image are displayed), as shown in FIG. 9, or it may be divided into four or more. Moreover, the display screen can be divided at various locations without limiting the dividing locations at the example locations illustrated above. Moreover, the sensor images displayed on the display unit 21 may be configured so that at least two of the sensor images from the first to third sensor images illustrated above are displayed.

The touch gesture is not limited to the example illustrated above, but various touch gestures, such as a drag operation with two fingers, may also be employed.

Although the present invention has a configuration of providing limitations according to the sensor image, this limitation is not limited to the example illustrated above.

The present invention may be configured to be carried not only in the ship but also in other movable bodies (for example, an airplane).

The sensors illustrated above is merely an example and may be configured to acquire the information from sensors other than illustrated above. For example, as the acoustic sensor, a scanning sonar may be used instead of the fish finder 14.

DESCRIPTION OF NUMERALS

1 Ship Instrument Network System
10 Ship Network
11 Touch Panel Device (Display Device)
12 GPS Antenna (GNSS Sensor)
13 Radar Antenna
14 Fish Finder (Acoustic Sensor)
15 Heading Sensor
16 Autopilot Device
21 Display Unit
22 User Interface
23 Memory
24 Detector
25 Controller
51 Image Acquirer
52 Gesture Detector
53 Operated Location Detector
54 Divided Area Identifier
55 Image Processor

What is claimed is:

1. A display device for installation in a ship, comprising:
a detector that detects a touch operation;
an image acquirer, associated with the display device, that acquires at least two of a navigation image containing map or nautical chart information created based on information obtained from a GNSS sensor for detecting a location of the ship, an underwater detection image created based on information obtained from an ultrasonic transducer for detecting underwater directly under the ship, and a radar image obtained from a radar antenna for detecting a location of an object around the ship;
a display unit that displays acquired images in respective divided areas of a display screen;
a processor executing a gesture detector that detects a predetermined touch gesture based on the touch operation detected by the detector, an operated location detector that detects an operated location of the touch gesture, and a divided area identifier that identifies which image among the images is displayed in the divided area corresponding to the operated location detected by the operated location detector;
an image processor having a function to perform scrolling or zooming of the display screen corresponding to the touch gesture, and for changing a direction or a motion range according to the image being displayed in the identified divided area, upon performing the scrolling or zooming, wherein the image processor applies a limitation to scrolling or zooming based on the identified image corresponding to the operated location of the touch gesture; and
wherein the image processor does not fix the direction of scrolling or zooming when the image in the identified divided area is the navigation image, and fixes zooming to a one dimensional zoom direction when the image in the identified divided area is the underwater detection image.

2. A display device for installation in a ship, comprising:
a detector that detects a touch operation;
an image acquirer, associated with the display device, that acquires at least two of a navigation image containing map or nautical chart information created based on information obtained from a GNSS sensor for detecting a location of the ship, an underwater detection image created based on information obtained from an ultrasonic transducer for detecting underwater directly under the ship, and a radar image obtained from a radar antenna for detecting a location of an object around the ship;
a display unit that displays acquired images in respective divided areas of a display screen;
a processor executing a gesture detector that detects a predetermined touch gesture based on the touch operation detected by the detector, an operated location detector that detects an operated location of the touch gesture, and a divided area identifier that identifies which image among the images is displayed in the divided area corresponding to the operated location detected by the operated location detector;
an image processor having a function to perform scrolling or zooming of the display screen corresponding to the touch gesture, and for changing a direction or a motion range according to the image being displayed in the identified divided area, upon performing the scrolling or zooming, wherein the image processor applies a limitation to scrolling or zooming based on the identified image corresponding to the operated location of the touch gesture; and
wherein the image processor fixes the zooming to a one dimensional zoom direction when the image in the identified divided area is the underwater detection image, and does not fix the direction of scrolling or zooming when the image in the identified divided area is the radar image.

3. The display device of claim 2, wherein the underwater detection image is an image where an underwater state directly under the display device is associated with time, and wherein the image processor fixes the direction of scrolling to a time-axis direction when the image in the identified divided area is the underwater detection image, and fixes the zooming to a one dimensional zoom direction perpendicular to the time-axis.

4. A display device for installation in a ship, comprising:

a detector that detects a touch operation;

an image acquirer, associated with the display device, that acquires images generated based on signals acquired by different sensors, the images including a navigation image for detecting a location of the ship, an underwater detection image for detecting underwater directly under the ship, and a radar image for detecting a location of an object around the ship;

a display unit that displays acquired images in respective divided areas of a display screen;

a processor executing a gesture detector that detects a predetermined touch gesture based on the touch operation detected by the detector, an operated location detector that detects an operated location of the touch gesture, and a divided area identifier that identifies which image among the images is displayed in the divided area corresponding to the operated location detected by the operated location detector; and an image processor having a function to perform scrolling or zooming of the display screen corresponding to the touch gesture, and for changing a direction or a motion range according to the image being displayed in the identified divided area, upon performing the scrolling or zooming, wherein the image processor does not fix the direction of scrolling or zooming when the image in the identified divided area is the navigation image, fixes zooming to a one dimensional zoom direction when the image in the identified divided area is the underwater detection image, and limits the motion range of scrolling or zooming when the image in the identified divided area is the radar image.

5. A display method, comprising:

a detection step for detecting a touch operation;

an image acquisition step for acquiring a navigation image containing map or nautical chart information created based on information obtained from a GNSS sensor for detecting a location of a ship, an underwater detection image created based on information obtained from an ultrasonic transducer for detecting underwater directly under the ship, and a radar image obtained from a radar antenna for detecting a location of an object around the ship;

a display step for displaying acquired images in respective divided areas of a display screen;

a gesture detection step for detecting a predetermined touch gesture based on the touch operation detected at the detection step;

an operated location detection step for detecting an operated location of the touch gesture;

a divided area identification step for identifying which image among the images is displayed in the divided area corresponding to the operated location detected at the operated location detection step; and an image processing step having a function to perform scrolling or zooming of the display screen corresponding to the touch gesture, for changing a direction or a motion range according to the image being displayed in the identified divided area, upon performing the scrolling or zooming, the image processing step does not fix the direction of scrolling or zooming when the image in the identified divided area is the navigation image, fixes zooming to a one dimensional zoom direction when the image in the identified divided area is the underwater detection image, and limits the motion range of scrolling or zooming when the image in the identified divided area is the radar image.

* * * * *